Nov. 5, 1968     G. H. ACKER ET AL     3,409,104

DUAL PRESSURE PROGRESSIVE VALVE STRUCTURE

Filed June 11, 1965     8 Sheets-Sheet 1

Fig. 1

INVENTORS
GEORGE H. ACKER
THOMAS J. GRUBER
JOHN R. LEBER
BY

ATTORNEYS.

Nov. 5, 1968 G. H. ACKER ET AL 3,409,104
DUAL PRESSURE PROGRESSIVE VALVE STRUCTURE
Filed June 11, 1965 8 Sheets-Sheet 4

INVENTORS
GEORGE H. ACKER
THOMAS J. GRUBER
BY JOHN R. LEBER

ATTORNEYS.

Nov. 5, 1968 G. H. ACKER ETAL 3,409,104
DUAL PRESSURE PROGRESSIVE VALVE STRUCTURE
Filed June 11, 1965 8 Sheets-Sheet 6

INVENTORS.
GEORGE H. ACKER
THOMAS J. GRUBER
BY JOHN R. LEBER

ATTORNEYS

United States Patent Office 3,409,104
Patented Nov. 5, 1968

3,409,104
DUAL PRESSURE PROGRESSIVE VALVE STRUCTURE
George H. Acker, Shaker Heights, Thomas J. Gruber, Chagrin Falls, and John R. Leber, Cleveland, Ohio, assignors to Eaton Yale & Towne Inc., a corporation of Ohio
Filed June 11, 1965, Ser. No. 463,401
8 Claims. (Cl. 184—7)

ABSTRACT OF THE DISCLOSURE

A divisional feeder in which lubricant is transmitted from a central station to a plurality of lubricated devices distant therefrom such as bearings. The feeder comprises a plurality of valve blocks each having a cylindrical bore and containing a four landed piston dividing the bore into a central chamber, a pair of end chambers, and a pair of valving chambers. A pair of input lines or passageways is provided with ports in each of the valve blocks between the central chamber of the valve block and the ends thereof. Outlet ports are provided in the central chamber of the valve blocks, and interconnecting lines are provided for enabling the position of the pistons to produce successive opening of inlet ports and connection to outlet ports through the passageways. In this manner, successive output lines deliver lubricant to the lubricating points in succession and a continuous cycle takes place.

---

This invention relates to lubricating system and concerns particularly a divisional feeder in which lubricant is transmitted from a central station to a plurality of lubricated devices distant therefrom such as bearings.

An object of the invention is to enable different quantities of lubricant to be delivered to different lubrication points during each cycle of operation of the system without stocking a large number of different sizes of lubricant feeders, or valve blocks therefor.

Another object of the invention is to facilitate obtaining accurate fit of pistons in cylinders.

Still another object of the invention is to facilitate obtaining accurate fit of pistons in cylinders.

Still another object of the invention is to enable a plurality of lubricant feeders of the same body design to be employed in the system.

Another object of the invention is to provide a lubricant feeder which functions in a progressive manner in that operation of one lubricant feeding valve is completed before an adjacent succeeding valve operates.

Still another object of the invention is to avoid troubles from excessive back pressure in the event that one of the lubricating points offers excessive resistance to the flow of lubricant such as to cause expansion of connecting conduit and contraction of entrained gas that cause a sustained, high pressure, return-flow tendency. Accordingly, it is an object to avoid "hanging up" or interference with the operation of the system in the event of excessive back pressure.

A further object of the invention is to avoid troublesome excessive back pressure independently of the efficiency of operation of the check valves in the lines to lubricating points.

The invention relates to divisional lubricant feeders of the general type illustrated in Higgens Patent 2,834,433 but having valve bodies which are all alike.

So-called "hang-up" or interference with operation may occur when one or more of the valves is subjected to excessive back pressure accompanied by low pressure at succeeding valves which relieves the inlet pressure and prevents sufficient pressure being available to restore the "hung-up" valve to the proper position.

Other and further objects, features and advantages of the invention will become apparent as the description proceeds.

In carrying out the invention in accordance with a preferred form thereof a plurality of identical valve blocks are employed each having a cylindrical bore and containing a pair of endwise movable landed pistons dividing the bore into a central chamber and end chambers, the ends of the bores being closed. A pair of input lines or passageways is provided with ports in each of the valve blocks between the center chamber of the valve block and the ends thereof, each inlet port being controlled by one of the valve pistons. Outlet ports are provided in the center chambers of the valve blocks, and interconnecting lines are provided for enabling the positions of the pistons to cause successive opening of inlet ports and connection to outlet ports through the passageways. In this manner, successive output lines deliver lubricant to the lubricating points in succession and a continuous cycle takes place.

The valve blocks are clamped between two spaced apart end blocks.

Each piston is provided with lands separated by a neck to form an intermediate port area in the cylinder between the central chamber and one of the end chambers. There is an inlet opening to the feeder inlet passages, each of which opens into one of the intermediate port areas of each of the valve blocks. Each block has outlets from the end chambers. Passages are provided so connected as to cause the pistons of each cylinder to be actuated in succession for the sequential and cyclical discharge of lubricant from the end chambers of the several blocks through their respective outlets.

These passages include for each block a passage connecting one end chamber of that block with one of the inlet passages through one of the intermediate port areas of another block to admit lubricant under pressure into said end chamber and thereby move the pistons endwise in the cylinder and a second passage connecting the other end chamber of that block with an outlet from that block through the central chamber of that other block when the pistons have been so moved.

A better understanding of the invention will be afforded by the following detailed description considered in conjunction with the accompanying drawings, in which.

Like reference characters are utilized throughout the drawing to designate like parts.

Although the invention is not limited to the use of separate valve blocks, for the sake of versatility and enabling a greater or lesser number of outlets to be provided according to the number of bearings or other points to be lubricated, each valve is preferably in a separate valve block. As seen from the perspective view, FIG. 33, in carrying out the invention into practical form with separate valve blocks and separate end blocks, and inlet block 11 and an end block 12 are provided with a plurality of valve blocks 13 clamped between the end blocks 11 and 12 by suitable means such as through bolts 14. The inlet block 11 has, as shown, a threaded opening 15 for connection to a source of fluid lubricant under pressure. Outlets 16 and 17 are also provided in each valve block.

Figure 1:
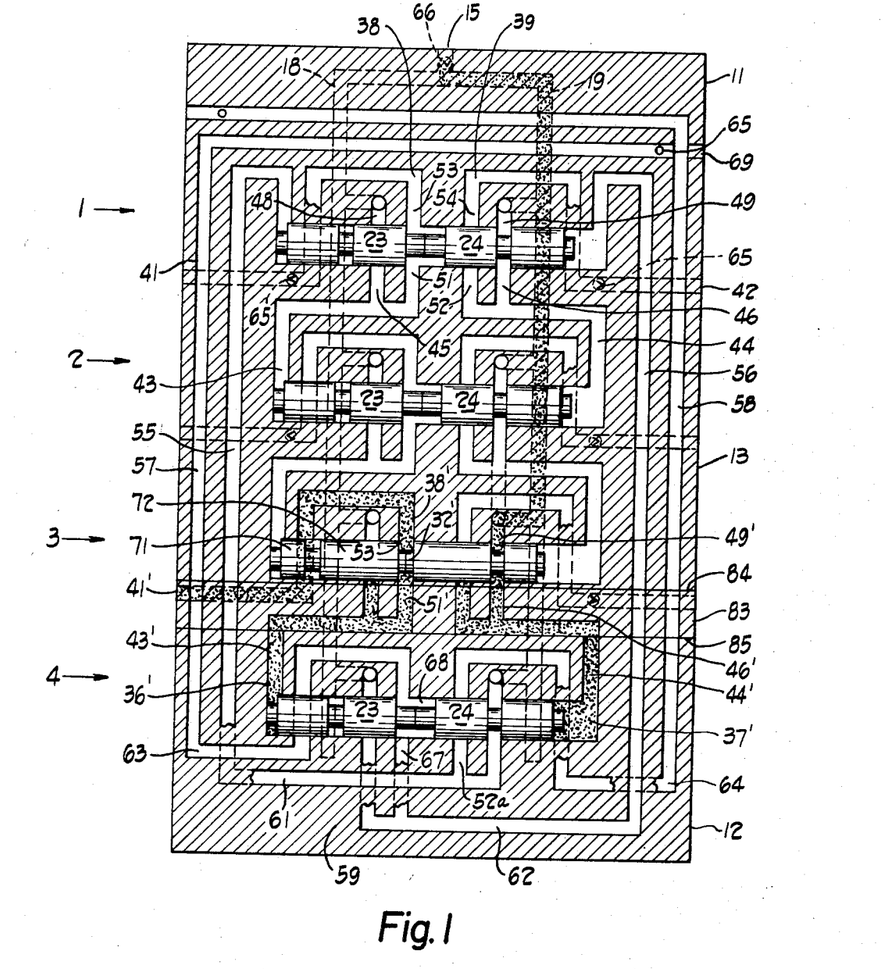
FIG. 1 is a schematic diagram and flow diagram of an embodiment of the invention.

The flow of lubricant and the action of the pistons in covering and uncovering ports is shown in the schematic diagram of FIG. 1. Connected to the inlet opening 15 in the inlet block 11, are a pair of inlet passageways 18 and 19 which continue through each of the valve blocks and terminate at the end block 12.

Figure 28:
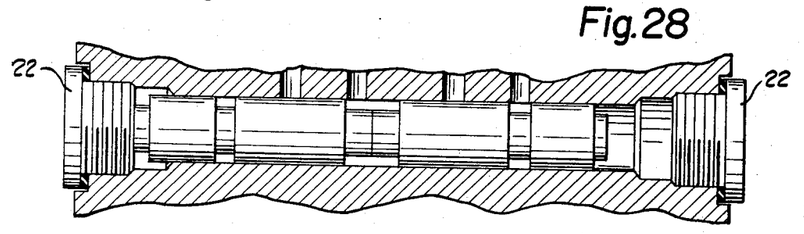
FIG. 28 is a view of alternative pistons of different length for obtaining a different stroke and consequently a different discharge quantity from the pistons shown in the upper two cylinders and the bottom cylinder of FIG. 1, FIG. 28 showing also port locations and location of cylinder end plugs for one of the valve blocks.
Figure 36:
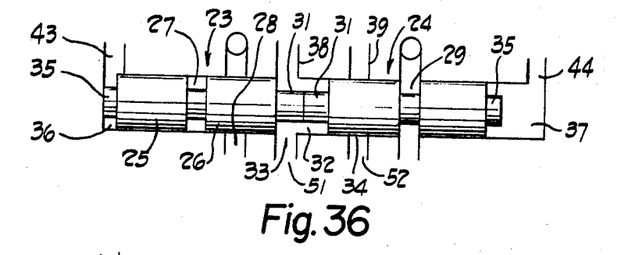
FIG. 36 is a schematic diagram of the pistons employed in the upper two cylinders and lower cylinder of FIG. 1 together with the porting arrangements corresponding to FIG. 1.
Figure 37:
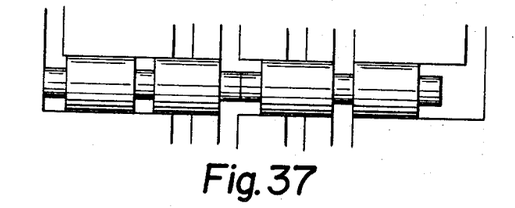
FIG. 37 is a view corresponding to FIG. 36 in which the pistons are symmetrical end for end with a slight modification in the location of the ports for use of symmetric pistons.

Each valve block 13 is drilled lengthwise to form a bore or hollow cylinder 21 (FIG. 16) the ends of which are closed by threaded plugs 22 (FIG. 28). Each cylinder 21 contains piston means preferably taking the form of two separate 2-landed pistons 23 and 24 (FIGS. 1 and 36).

Each piston comprises a pair of lands 25 and 26 separated by a neck portion 27 which, as will be explained hereinafter, serves for opening an inlet port from one or the other of the inlet passageways 18 or 19 when the neck portion is in one of the intermediate port areas 28 or 29 in the cylinder 21. Each of the pistons 23 and 24 is provided also with an inwardly extending stem 31 in order to leave a central chamber 32 open in the cylinder 21 between outlet ports 33 and 34. If desired, each piston 23 and 24 may also be provided with an end stem 35 extending outwardly into end chambers 36 and 37 in the cylinder 21.

Outlet passageways 38 and 39 are formed in each block extending from the outlet or exhaust ports 33 and 34 to outlets 41 and 42, respectively. As will be explained more fully hereinafter, each outlet passageway may, if desired, be formed in part in one block and in part in an adjacent block for convenience in manufacturing and to enable the discharge from an end chamber in a block to issue from an outlet in the same block.

For each cylinder there is also a pair of transfer passageways 43 and 44. Each transfer passageway 43 or 44 is connected at one end to an end cylinder chamber 36 or 37 and is branched at the other end. Outer branches 45 and 46 are at the intermediate port areas 28 and 29 opposite inlet ports 48 and 49. Inner branches 51 and 52 are opposite exhaust ports 53 and 54 connected to outlet passageways 38 and 39, respectively.

As already explained, the blocks are drilled with suitable transverse openings so that the inlet passageways 18 and 19 extend through all the valve blocks of the feeder. In order that the operation may be cyclical with the first valve operating again after the last has operated, additional transverse holes are drilled in the valve blocks to provide return passageways from the upper block to the lower and vice versa. One set of such drilled holes provides interconnecting passageways 55 and 56 for completing the transfer passageways corresponding to passageways 43 and 44 between the uppermost cylinder and the lowermost cylinder and vice versa. Likewise, another set of drilled holes is for forming interconnecting passageways 57 and 58 for completing the outlet passageways corresponding to passageways 38 and 39 between the lowermost block and the uppermost.

The end block 12 is formed with suitable interconnecting passageways including transfer or cross-over passageways 61 and 62 connected to interconnecting passageways 55 and 56, respectively, and portions of outlet passageways 63 and 64 connected to interconnecting passageways 57 and 58, respectively. However, in order that reverse movement of the pistons in the upper block will commence after movement in one direction of all of the blocks has been completed a crossover 59 of passageways 61 and 62 is provided so that the transfer passageway 61 is connected to ports of the lowermost cylinder on the right hand side instead of the left and likewise the transfer passageway 62 is connected to ports on the left hand side instead of the right.

Discharge check valves 65 may be mounted in the outlets 41 and 42 and an inlet check valve 66 may be mounted at the inlet opening 15 if desired. The inlet check valve, however, does not form a part of my present invention and is therefore neither illustrated nor described in detail since a conventional check valve known to those skilled in the art may be employed.

In order to simplify the schematic flow diagram and enable the passageways to be shown in a single plane the actual location of passageways in the blocks has been modified to some extent in the schematic showing of FIG. 1 primarily in the uppermost valve block. The actual location in illustrative blocks is shown in FIGS. 2 to 27 inclusive. FIG. 1 serves, however, to illustrate the principle of operation.

It is assumed that initially all of the pistons are to the left, as shown in FIG. 1, except the pistons in the lowermost cylinder which are assumed to have been to the right instead of to the left as shown. Then when lubricant under pressure is applied to the inlet 15 it fills inlet passageway 18 and also fills inlet passageway 19 but has no effect on the first three pistons since these pistons are already moved to the left. Upon reaching the next to the last valve block 13, however, the lubricant issues from the inlet port 49' through an open intermediate port area, since the piston is to the left, through an opposite port into a branch 46' of a transfer passageway 44' into an end chamber 37' of the lowermost cylinder, applying pressure to the right hand end of the pistons moving the piston 24 to the left against the piston 23 so that both pistons assume the left hand position illustrated in FIG. 1. The path of the lubricant effecting this action is represented by the stippled passageways.

The lubricant already in the left hand end chamber 36' of the lowermost cylinder however is forced out and through a transfer passageway 43' and its branch 51' across the central chamber 32' of the cylinder above the lowermost cylinder into the outlet port 53' and through the outlet passageway 38' to the outlet 41' of the lowermost valve block. The outlet 41' is connected as already explained through suitable tubing, conduit or the like to one of the bearings or lubrication points which are to be served by the lubricant feeder.

As a result of the movement of the lowermost piston to the left as already explained, a right hand inlet port is opened and action similar to that already explained takes place with lubricant passing through the inlet passageway 19 the passageways 61 and 55 to the left hand end of the uppermost cylinder filling the left end chamber of that cylinder and causing the uppermost pistons to move to the right. Movement of the uppermost pistons to the right expels lubricant from the right hand end chamber of the uppermost cylinder. This passes down through the passageways 56 and 62, a branch passageway 67 across the central chamber 68 of the lowermost cylinder (the previous movement of the piston 23 to the left having opened the port between the branch passageway 67 and the central chamber 68). Thereupon the lubricant continues through passageways 63 and 57 to the outlet 69 of the uppermost block. It will be observed that valving controlling the inlet to any end cylinder chamber or the outlet therefrom is in the adjacent valve block. In the particular embodiment illustrated it is in the valve block immediately preceding except that for the uppermost cylinder the controlling valving is in the lowermost cylinder block.

It will be understood that if it is desired to discharge greater or lesser amounts of lubricant from one of the cylinders to the bearings or lubricant points connected to the outlets thereof this might be accomplished by using a block in one or more locations having a larger bore and accordingly larger diameter cylinders. This is not necessary, however, in order to obtain selectively different discharge from different valve blocks and identical valve blocks may be employed to obtain selectively different discharge by using different pistons to obtain different amounts of travel. For example, as illustrated in FIG. 1, the upper two cylinders and the lowermost cylinder have identical pistons whereas the piston in the cylinder of second last valve block 13 is shorter than the other two pistons to permit longer travel and consequently greater discharge. In order that the ports will open and close properly as the pistons are moved from one extreme position to the other, the outermost lands 71 are made shorter than in the case of the land 25 of the pistons 23 and 24 and the inward lands 72 are made longer as shown in FIG. 29.

Figure 29:
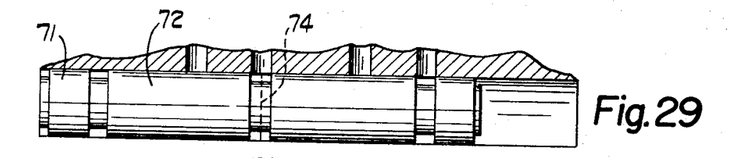
FIG. 29 is a view corresponding to FIG. 28 showing still another piston length for obtaining greater stroke and greater discharge for each stroke than the design of FIG. 28.
Figure 30:
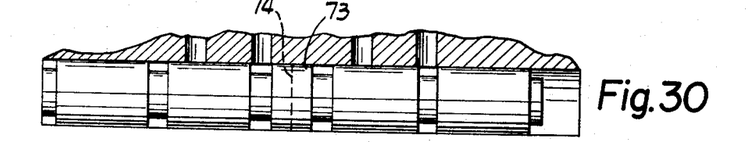
FIG. 30 is a view of still another piston design for shorter strokes.

An arrangement for amount of discharge and length of travel greater than in the case of the upper cylinder of FIG. 1 is shown in FIG. 29 and an arrangement for less discharge and length of travel is shown in FIG. 28. If a very short stroke and relatively small discharge for each stroke is desired, a still longer piston, or a pair of pistons as illustrated in FIG. 30 may be employed. This may take the form of a single 5-landed piston as shown or the piston means may be split in the middle as illustrated in FIGS. 1 and 28. The middle land 73 helps to support the piston but is not required. The dotted lines 74 in FIGS. 29 and 30 represent optional lines of division between pistons according to whether it is desired to employ a pair of pistons or a single integral piston. As explained, hereinafter, the use of separate pistons in each cylinder is advantageous.

It will be understood that after all pistons have moved to the left to the position shown in FIG. 1 and then the pistons in the uppermost cylinder have been moved to the right as explained, the next piston and the remaining pistons will successively move to the right until all of them have been moved to the right, whereupon the pistons successively move to the left beginning with the uppermost one. Thus progressive cyclical operation takes place.

The centrally extending piston stems 31 and the central chamber 32 of the cylinder 21 are exposed only to the outlet, or discharge, or delivery pressures of the respective component valves. By virtue of the fluid flow resistance through those passages joining the central chamber to the end chambers of the interconnected "downstream" valves, and the sliding resistance of the valve pistons, the inlet pressures tend to exceed the discharge pressures. As a result, the two 2-land pistons in each cylinder, operationally, normally bear against each other under a force equal to the difference between inlet and discharge pressures operative on the pair of pistons.

Such a two-piston construction has a number of merits. One is that the shorter two-shoulder pistons, which are identical and may, if desired, as already explained, be made symmetrical end for end, can be more accurately made with respect to variance in shoulder diameters than an equivalent single 4-land piston, with a greatly reduced tendency to bow from heat-treatment strain relief after grinding.

Moreover, the shorter 2-land pistons are less subject to any fit interference caused by slight departure from straightness of valve bore. Such straightness error of small magnitude is difficult to reduce to absolute zero in the process of producing the bore, and is subject to further minute deviations resulting from clamping strains on the valve block. Consequently, the shorter 2-land piston may be more accurately fitted even when having the same land diameter accuracy as the single 4-land piston.

As already explained, pistons of substantially varied stroke (providing greater displacement capacity) may be utilized while employing a valve block design identical with that used with the pairs of symmetrical or substantially symmetrical 2-land pistons. This reduces the number of valve bodies to be made, and the quantities that must be stocked, as well as eliminating the source of error in manifold assembly.

Figure 38:
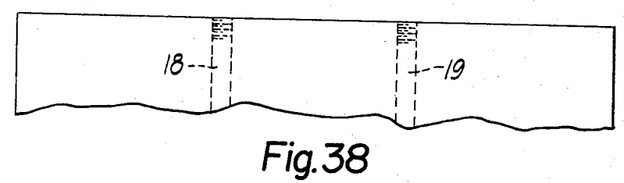
FIG. 38 is a fragmentary view of a modified arrangement of passages in the inlet-block portion of the apparatus of FIG. 1 for obtaining dual-line operation in response to reversing lubricant flow instead of progressive-sequential operation.
Figures 39, 40:
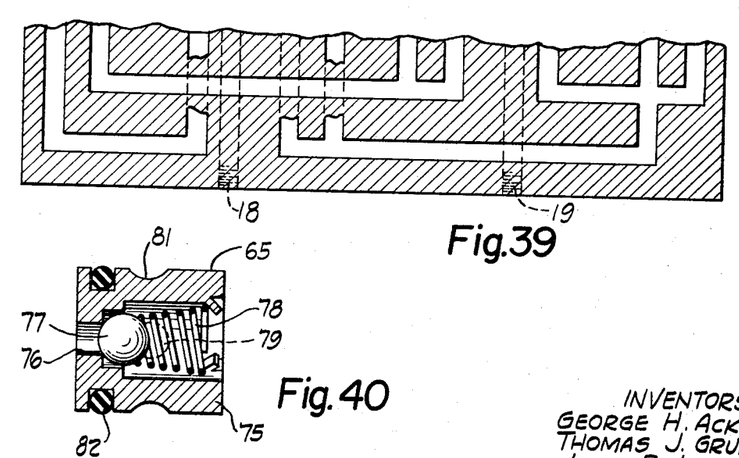
FIG. 39 is a corresponding view of modified passage arrangement at the opposite end block portion of the apparatus of FIG. 1 for obtaining dual-line operation instead of progressive-valve operation.
FIG. 40 is a cross-sectional view of a suitable form of outlet check valve.

The manifold design represented in FIG. 1 can, as shown in FIG. 38, be provided with an inlet end block having the two inlet passages starting from the outside face of the inlet block and connecting with the two supply lines of a 2-line lubricating system of the general type described in Hillis Patents 2,094,271 and 2,143,733. With only that modification, the manifold will function as a progressive 2-line manifold for use in a conventional 2-line system where the advantages peculiar to a progressive manifold may be desirably employed. By a modification of the end block of the manifold as shown in FIG. 39 to permit the two inlet passageways 18 and 19 to pass through that member, additional manifolds of this type can be conduit connected to operate similarly. Progressive action takes place only within each manifold.

When end blocks of the type shown in FIGS. 38 and 39 are employed, with lubricant first driven into passageway 18 and returning through passageway 19 and then reversed to flow into passageway 19 and return through passageway 18, all of the pistons are first driven in one direction and remain in that position until the direction of flow of lubricant is reversed; whereupon the pistons move successively in the opposite direction and there remain until the direction of flow of lubricant is again reversed; except that with the cross-over passageways shown, the uppermost pistons will always rest in the opposite position to the others when a cycle is completed before the next reversal of input fluid.

A further advantage of this two-inlet construction over reversing type valves for reversing systems heretofore employed, and of the construction represented by FIG. 1 over single-line progressive systems heretofore employed, is that if, as unfortunately happens, the back pressure at a discharge connection can produce a back seepage of fluid, building up pressure behind a piston which is at the discharge end of its stroke, less difficulty from piston drift is provided. It must be appreciated that at any instant the pressure in the inlet lines may have a high value built up to overcome the high discharge resistance of one discharge outlet, but at a subsequent instant the inlet pressure may fall to approach that needed to satisfy a lower discharge pressure requirement of subsequent (downstream) valves.

Under this latter circumstance, the back flow from the high pressure discharge may create at that instance a pressure in the space between the two inner piston lands exceeding the inlet pressure. Since the 2-land piston discharging to this high back pressure discharge connection had completed its travel in making such discharge, it is restrained from movement under the separating force created between the two 2-land pistons, but its mating piston may be forced to move away from it tending to discharge back into the inlet passage and raising the inlet pressure. The upstream valve will not be affected, hence the piston in question will continue to have inlet pressure behind it, so that even though the piston in question moves far enough to cut off the inlet line connection with the downstream valve, the result would be to raise the inlet line pressure to a corrective valve, returning the drifting piston to abutment with its mate and displacing the back leakage to its source. The foregoing advantage exists whether the valves are employed in a single line progressive system as illustrated in FIG. 1 or in the reversing two-line system represented by FIGS. 38 and 39.

It is not likely that, even with such return flow through a failing check valve that sufficient piston drift can take place in the probable time available to open the chamber between the two inner piston lands to both discharge lines simultaneously, but even though that did happen, the result would only be the possible movement of some fluid from one discharge connection to its mate, and that could hardly be a continuing performance, as the pressure in the high pressure discharge line would then be dissipated.

It will also be noted that back flow at a discharge outlet also has passage to the end of the downstream valve opposite that of the drifting piston, and if the drifting piston moves far enough to uncover the discharge passage of the downstream valve, the pressures on the two ends of that valve are neutralizing, and its pistons do not move.

In all the circumstances considered above, it will be noted that on the discharge side of the valve, all of the 2-land pistons maintain their positions, and that therefore the inlet passages are securely closed by their respective piston shoulders. Valve stall through back flow of fluid is therefore eliminated, by virtue of the two piston design. This follows from the fact that regardless of where such 2-land piston drift occurs, if it is extensive enough, it closes off its inlet cross port serving the next downstream valve, automatically raising the inlet pressure and restoring the drifted piston to its normal position.

The outlet check valve shown in FIG. 40 comprises a cup-shaped insert 75 having a central opening 76 in the bottom serving as a seat for a ball check 77 which is resiliently biased upon the seat 76 by a conical compression spring 78. There are also side openings 79 in the cup-shaped insert serving as outlets for fluid entering through the opening 76. The circumference of the cup-shaped insert 75 is recessed to form an annular groove 81 in alignment with the outlet openings 79. Any suitable means such as an O-ring seal 82 is provided for enabling the insert 75 to make a fluid-tight fit in the bore in which it is to be inserted.

Figure 31:
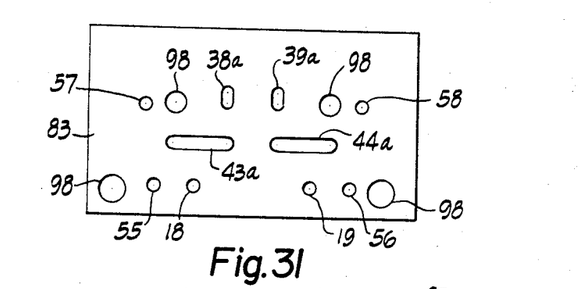
FIG. 31 is a face view of a spacer employed between valve blocks.
Figure 32:
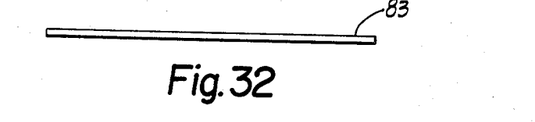
FIG. 32 is an edge view of the spacer of FIG. 31.

When the blocks such as the valve blocks 13 and the end block 12 are assembled, spacers 83 such as illustrated in FIGS. 31 and 32 are interposed. The approximate location of the spacers 83 is indicated in FIG. 1 between lines 84 and 85. It is to be understood, however, that the thickness of the spacers is distorted by the separation of lines 84 and 85 and that in the interest of simplifying the flow diagrams the location of the outlets 41 and 42 has been modified since the outlets are from the blocks 13 and not from the spacers 83. The lines 84 and 85 have been drawn in FIG. 1, however, to facilitate a tracing of the fluid circuit paths in the actual valve blocks shown in FIGS. 11 to 20 inclusive and the spacer 83, which is slotted to provide transverse passageways from openings in the face of one block to the adjacent face in the next block.

Figure 17:
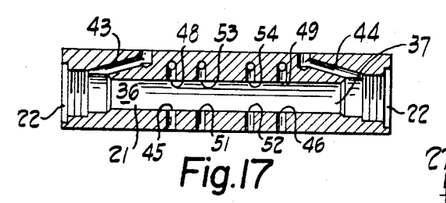
FIG. 17 is a view of a section of the valve block of FIG. 11 represented as cut by a plane 17B—17B indicated in FIG. 13.

Thus, the transfer passageways corresponding to the transfer passageway 43 shown in FIG. 1 are provided in the actual valve blocks as follows: Referring first to FIG. 17 from the left hand end chamber 36 of the cylinder 21 under a plug 22 closing the end of the cylinder through an obliquely drilled, transfer-passageway, opening 43 and a drilled hole in the face of the block, perpendicular to the face, forming a continuation of the passageway 43, a slot 43a in the spacer 83 of FIG. 31 along the faces of the blocks abutting the spacer 83 and into ports at the ends of passageway branches 45 and 51 (shown again in FIG. 17 but representing the corresponding ports of a block adjacent to that shown in FIG. 17). As already explained, the branch 45 is adapted to cooperate with the port 48 of the inlet passageway 18 to the intermediate port area 28 (FIG. 31) when the pistons are moved to the right. Corresponding openings in the blocks and the spacer provide the passageway 44 of FIG. 1. The port of the branch 51, as previously explained, is at the central chamber 32 of the cylinder 21 to cooperate with the outlet passageway 38.

The manner in which the outlet passageways are formed will be explained in connection with the passageway 39 of FIG. 1 owing to the location at which the sectional views were taken in FIGS. 19 and 20. The outlet passage from the intermediate port area 29 (FIG. 36) is through the port 54 shown in FIGS. 1 and 17, the passage 39 shown in FIG. 19, the spacer slot 39a shown in FIG. 31, the passage 39b in the block adjacent to that shown in FIG. 19 but, of course, also represented by corresponding passage 39b shown in FIG. 19 into the base of an outlet check valve socket 65b in the block shown in FIG. 16 through the central inlet opening 76 of the check valve 65 (FIG. 40) under the ball check 77 out through the opening 79 and the outlet 42, through a drilled hole 87 and into the threaded outlet opening 17 in the edge of the valve block shown also in FIG. 33. It will be understood that if the outlet conduit is threaded into the opening 17, the opening 17a shown in FIG. 16 will be plugged. However, if desired, the opening 17 instead may be plugged and the outlet connection may be made to the end opening 17a.

Figure 19:
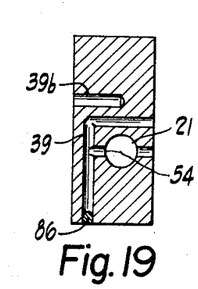
FIG. 19 is a view of a cross section of the valve block of FIG. 11 represented as cut by a plane 19D—19D indicated in FIG. 16.

As shown in FIG. 19, the various passageways are formed in the block by holes drilled from the outside and where necessary the outer end of the opening is closed. For example, in FIG. 19 the outer end of the drilled passageway 39 is closed by a steel ball 86 welded into place after the necessary holes have been drilled.

It will be understood that the valve blocks may, if desired, be made integral with the spacers to form valve block means in which the slots provided by the spacers are formed in the faces of blocks instead of being provided by separate spacers.

For the sake of illustration an arrangement has been shown in which 4-landed piston means are employed and this arrangement is preferred in that it permits splitting the piston means into two separate pistons in each valve cylinder. However, the invention is not limited thereto. It does not exclude the use of 3-landed pistons in which a center land is so spaced with respect to the length of the piston and the location of the end lands as to close the passageways 51 and 46 while the passageways 45 and 52 are open and vice versa. This preserves the advantages of having the ports controlling outlet passageways in the central portion of the cylinder, the ports controlling the inlet passageways between the central portion of the cylinder and the end chambers.

The construction is such that, if desired, a double supply of lubricant may be furnished through one of the outlet openings with the other one closed. This is accomplished by cross drilling between the outlets 41 and 42 as represented by a drilled hole 88 shown in FIG. 16 interconnecting the outlet areas of the check valve sockets 65a and 65b. When such operation is desired with the lubricant expelled from either end chamber passing through a single outlet connection all of the threaded outlet openings such as 16 and 16a and 17 and 17a are plugged except for one by a conventional threaded plug and a plug is also threaded into the threaded socket 89. A plug is utilized which closes the opening 89 but does not extend into the tapered portion 91 of the socket, which intersects the cross-drilled hole 88.

Figure 34:
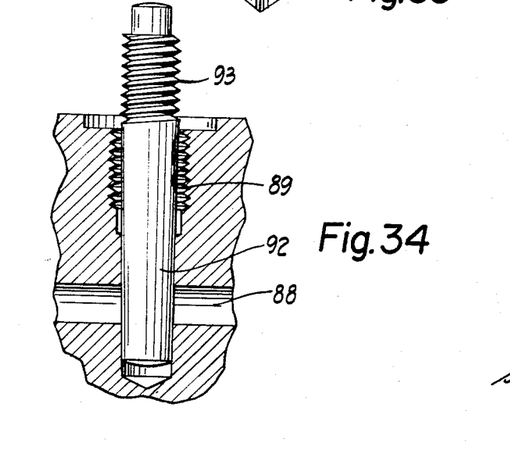
FIG. 34 is a fragmentary view of a modification in the valve block for enabling each valve block to be used selectively either for discharging to different bearings from each outlet or for causing the outflow from each outlet to supply a single bearing by providing a cross passage between outlets adapted to be closed by a closure plug.
Figure 35:
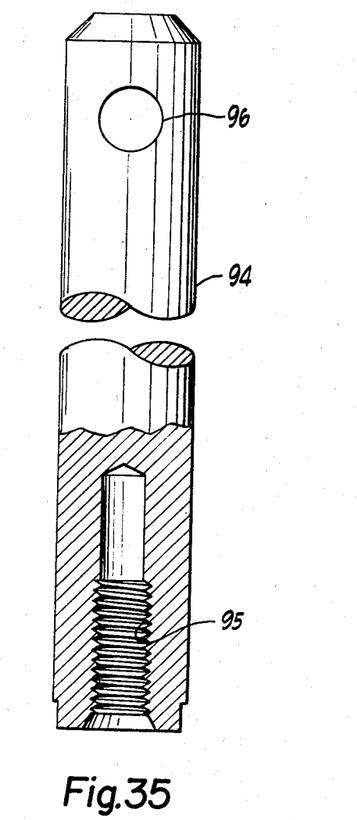
FIG. 35 is a view partially in section of a closure plug extractor for the closure plug of FIG. 34.

If it is desired to obtain normal operation with lubricant supplied to outlet conduits through two of the threaded outlet connections such as 16 and 17 (connections 16a and 17a being plugged), a tapered pin 92 is driven into the tapered opening 91 so as to close the cross-drilled hole 88. Such a tapered pin 92 is shown in FIG. 34. It is preferably threaded at the upper end 93 as shown so that when it is desired to remove the tapered pin this may be accomplished by a cross-drill, closure-plug extractor 94 such as shown in FIG. 35. The extractor 94 has a tapped socket 95 adapted to engage the threaded upper end 93 of the taper pin 92 and suitable means such as a cross pin 96 are provided for rotating the extractor 94 when it is desired to remove the taper pin 92. Thereupon a conventional threaded plug is inserted in the thread 89.

Figure 16:
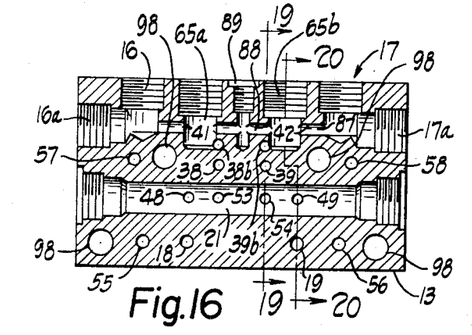
FIG. 16 is a view of a section of the valve block of FIG. 11 represented as cut by a plane 16A—16A represented in FIG. 12.
Figure 20:
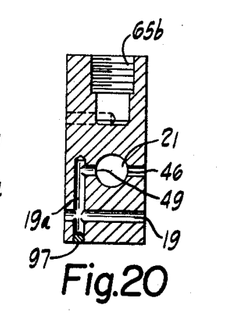
FIG. 20 is a view of a cross section of the valve block of FIG. 11 represented as cut by a broken plane 20E—20E indicated in FIG. 16.

The manner in which the inlet passageways are formed in the valve blocks and the spacer 83 may be observed by tracing the inlet passageway 19 from the inlet block 11 in FIG. 1 through the portion of the passageway 19 shown as a drilled hole 19 in the spacer 83 (if employed at this position), the portion shown as the drilled hole 19 at the inlet face of the uppermost block as shown in FIGS. 16 and 20, the drilled hole 19a in FIG. 20 to the inlet port 49 shown in FIGS. 20 and 17 into the intermediate port area 29 shown in FIG. 36, the port of outer branch 46 shown in FIGS. 17 and 20 through slot 44a of a spacer 83 at the outlet face of the uppermost block and a passageway 44 of the next block as in FIG. 17 to the right hand end chamber 37 of the cylinder 21, FIGS. 17 and 36.

The drilled hole 19a is closed by a welded steel ball 97, as shown in FIG. 20.

Figure 33:
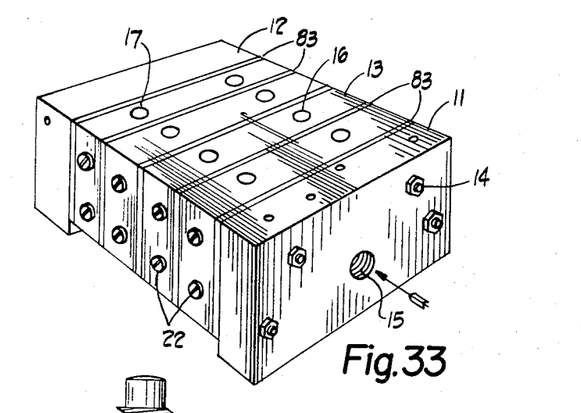
FIG. 33 is a perspective view of the feeder of FIG. 1.

The clamping through bolts 14 shown in FIG. 33 are passed through openings 98 in the blocks and the spacer 83.

Figure 21:
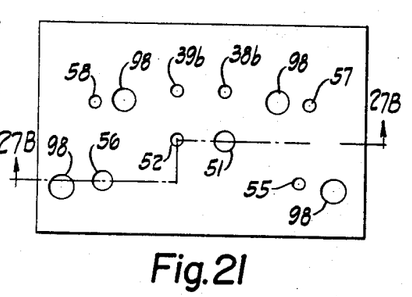
FIG. 21 is a view of one face of the final end block of the apparatus of FIG. 1.
Figure 22:
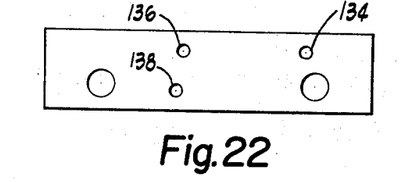
FIG. 22 is a bottom view of the end block of FIG. 21.
Figure 23:
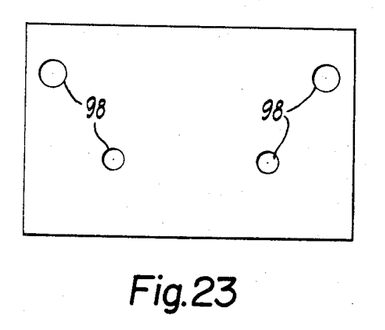
FIG. 23 is a view of the opposite face of the end block of FIG. 21.
Figure 24:
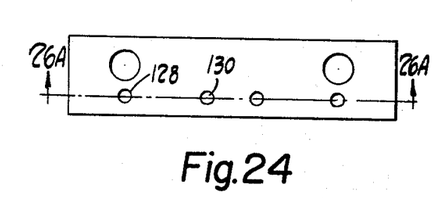
FIG. 24 is a top view of the end block of FIG. 21.
Figure 25:
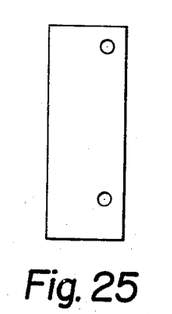
FIG. 25 is an end view of the end block of FIG. 21.

The end block 12 is provided with crossover passageways in order to provide connections between the lowermost valve block and the transfer passageways 55, 56, 57 and 58. Openings 38b and 39b in the face of the end block shown in FIG. 21 are adapted to abut one of the end spacers shown in FIG. 31 and to register with the slots 38a and 39a so as to connect with the passageways 38 and 39 of the valve block shown in FIGS. 13, 16 and 19. Passageways are drilled in the end block to form the passageways 63 and 64 shown in FIG. 1 and make connection with the transfer passageways 57 and 58. For example, the connection between the opening 39b and the opening 58 is formed by drilled holes shown in FIGS. 26 and 27. These include a vertically drilled hole 125 joining the drilled hole 58, a horizontally drilled hole 126 intersecting the vertical drilled hole 125, and a vertical drilled hole 127 intersecting the horizontal drilled holes 126 and 39b. It will be understood the drilled holes 125, 126 and 127 are as before closed by welded steel balls 128, 129 and 130. Thus the inner portion of the drilled hole 126 forms a portion of the passageway 64 shown in FIG. 1. In a similar manner intersecting drilled holes are provided to form the passageway 63 of FIG. 1.

Figure 26:
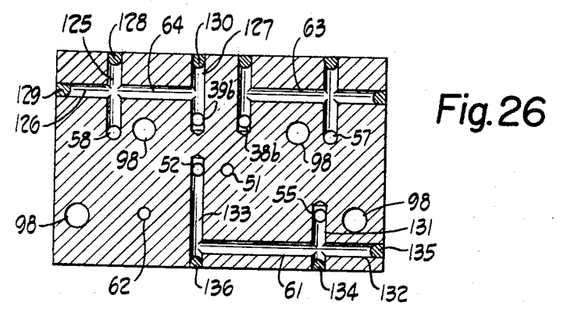
FIG. 26 is a view of a section of the end block of FIG. 21 represented as cut by a plane 26A—26A indicated in FIG. 24.
Figure 27:
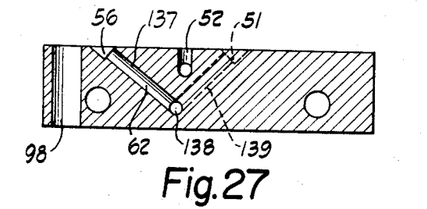
FIG. 27 is a view of a section of the end block of FIG. 21 represented as cut by a broken plane 27B—27B indicated in FIG. 21.

The passageways 61 and 62 of FIG. 1 are also formed by drilled holes in the end block 12 as shown in FIGS. 26 and 27. For example, a passageway from the opening 55 on the face of the end block shown in FIG. 21 is made through a vertical drilled hole 131 (FIG. 26), an intersecting horizontal drilled hole 132, a vertical drilled hole 133, a horizontal drilled hole with an opening 52. It will be understood that the drilled holes 131, 132 and 133 are closed by welded steel balls 134, 135 and 136, respectively. It will be understood that the opening 52 registers with the slot 44a of the spacer shown in FIG. 31 in order to make connections with the ports of branch passages 46 and 52 of the adjacent valve blocks such as shown in FIG. 17.

In a similar manner the passageway 62 is formed by diagonally drilling horizontal drilled hole 137 intersecting a vertical drilled hole 138 (FIG. 27) which in turn intersects a horizontal hole, not visible in FIG. 27, terminating in the opening 51, and represented by dashed lines 139.

Figure 2:
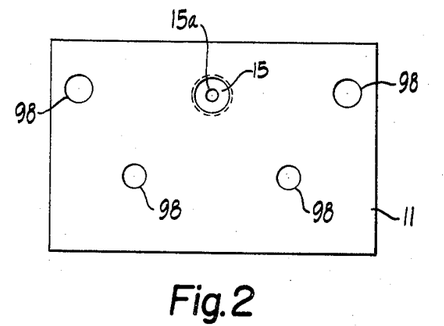
FIG. 2 is a view of the outside face of one of the end blocks constituting the inlet block.
Figure 3:
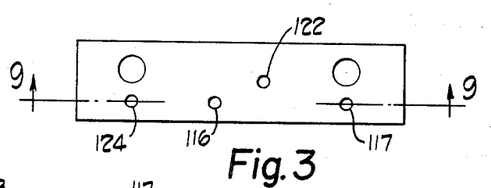
FIG. 3 is a plan view of the block of FIG. 2 referred to for the sake of convenience as a top view, the block resting on one edge.
Figure 4:
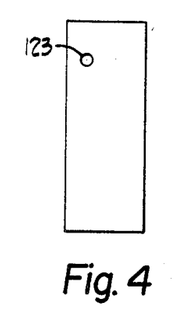
FIGS. 4 and 5 are end views of the inlet block of FIG. 2.
Figure 5:
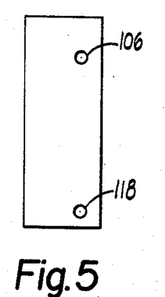
Figure 9:
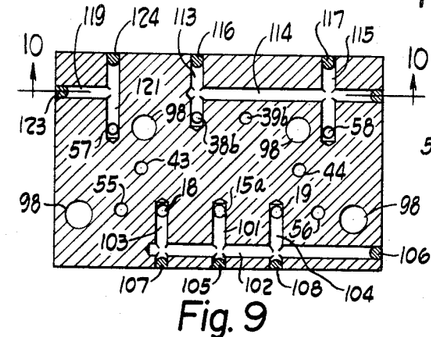
FIG. 9 is a view of a longitudinal section of the block represented as cut by a plane 9—9 represented in FIG. 3.
Figure 13:
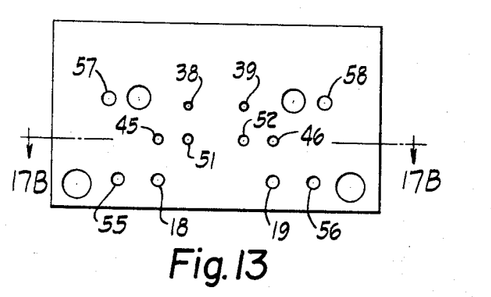
FIG. 13 is a view of the opposite face of the valve block of FIG. 11.
Figure 14:
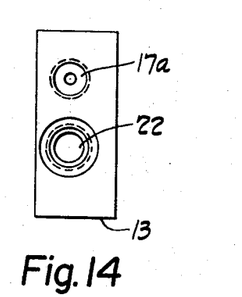
FIG. 14 is a view of the valve block as seen from either end.
Figure 15:
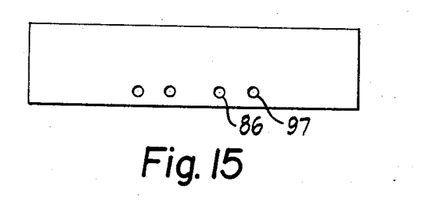
FIG. 15 is a bottom view of the valve block of FIG. 11.

The inlet passageway from the inlet threaded opening 15 in the inlet block 11 may be traced in FIGS. 2 and 9 through the drilled hole 15a centered in the opening 15, a drilled hole 101, a drilled hole 102 providing lateral connections to drilled holes 103 and 104 to intersect drilled holes 18 and 19 which are aligned with corresponding drilled holes 18 and 19 in the spacer 83 of FIG. 31 (if used at the inlet) and the aligned holes 18 and 19 in the block of FIGS. 13 and 16 to form the branch inlet passages 18 and 19 shown in FIG. 1. It will be understood that the outer ends of the drilled holes 101, 102, 103 and 104 are closed in a suitable manner as by means of steel balls 105, 106, 107 and 108, respectively, welded in place as shown in FIG. 9.

The transfer passages 43 and 44 may also be traced in the inlet block 11. For example, the drilled hole 44 of the valve block shown in FIGS. 11 and 17 and the slot 44a of the spacer shown in FIG. 31 register with the drilled hole 44 shown in the inlet block in FIGS. 6 and 9. This drilled hole 44 intersects the vertically drilled hole 111 in the inlet block (FIG. 8) which in turn intersects the drilled hole for interconnecting passageway 56 shown in FIG. 8 which registers with the drilled holes 56 in the spacer of FIG. 31 and all the valve blocks as shown in FIGS. 1, 11 and 13.

Figure 6:
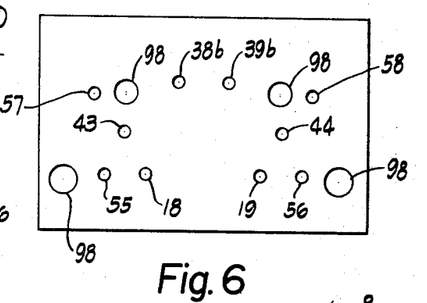
FIG. 6 is a view of the opposite face of the inlet block.
Figure 7:
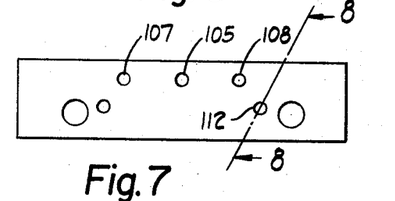
FIG. 7 is a bottom view.
Figure 8:
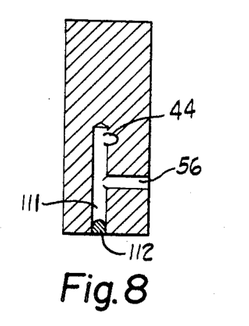
FIG. 8 is a view of a cross section of the block represented as cut by the plane 8—8 indicated in FIG. 7.

The hole 56 in the inlet block as shown in FIG. 8 is drilled at an angle so as to meet the vertical drilled hole 111. It will be understood that the lower end of the drilled hole 111 is plugged in a suitable manner as by means of a steel ball 112 welded in place. The hole 44 as shown in FIG. 8 is drilled from the face of the block 11 to meet the vertical hole 111. In the particular structure illustrated and with the relative dimensions shown, the hole 56 is drilled at an angle of 25°. In a corresponding manner the openings 43 and 55 in the face of the inlet block shown in FIG. 6 are connected within the block.

Figure 10:
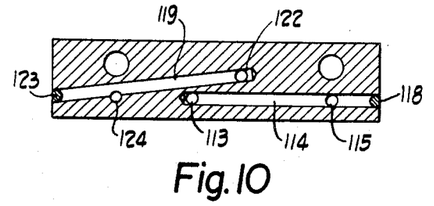
FIG. 10 is a view of a section of the inlet block represented as cut by the plane 10—10 indicated in FIG. 9.

The outlet passages 38 and 39 of the lowermost valve block, which control the discharge from the uppermost valve block are returned thereto through passages in the inlet block 11 and interconnecting passages 57 and 58. For example, in the case of the outlet passageway 38, the outlet opening 38b of the uppermost valve block (FIG. 18) registers with a corresponding opening 38b in the inlet block shown in FIG. 6 and FIG. 9. In the inlet block, a connection thereto is made through a drilled hole 113 (FIG. 9) extending vertically, a horizontal drilled hole 114, a vertical drilled hole 115 which intersects a horizontal drilled hole 58 perpendicular to the face of the block shown in FIG. 6. It will be understood that the drilled holes 113, 114 and 115 are closed in their outer ends by suitable means such as steel balls 116, 117 and 118, respectively and welded in place. The holes 113, 114 and 115 are shown also in FIG. 10.

Figure 11:
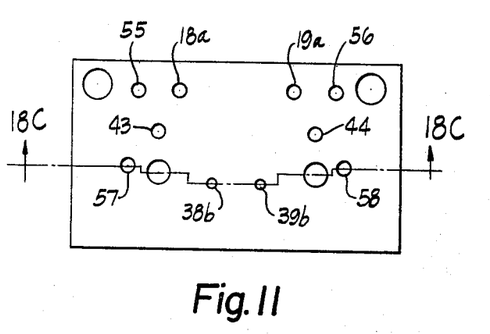
FIG. 11 is a view of one face of one of the valve blocks of the feeder represented in FIG. 1.
Figure 12:
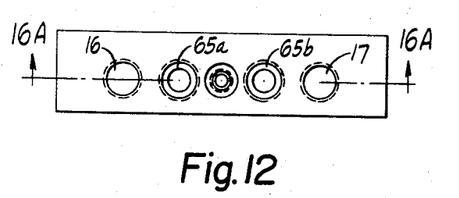
FIG. 12 is a top view of the valve block of FIG. 11.
Figure 18:
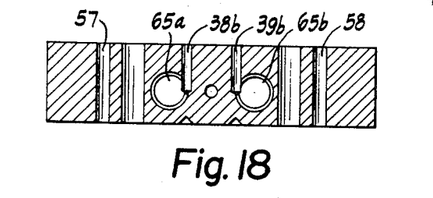
FIG. 18 is a view of a section of the valve block of FIG. 11 represented as cut by a broken plane 18C—18C indicated in FIG. 11.

In this manner the interconnecting outlet passageway 58 extending through holes 58 in the spacer of FIG. 31 and the valve blocks of FIGS. 11, 13 and 18 passes through the passages necessary to deliver the outlet from the lowermost cylinder through the passage 42 of the uppermost block. As already explained, passageways in the end block 13 are provided to connect the outlet passageway 38 of the lowermost valve block to the interconnecting passageway 58. In a similar manner a diagonally drilled horizontal drilled hole 119 shown in FIG. 10 serves for interconnecting the passageway 57 through a vertical drilled hole 121 and another vertically drilled hole 122 intersecting in a plane, not shown in FIG. 9, with the drilled hole 39b. The horizontal diagonally drilled hole 119 is closed by a welded steel ball 123 and the vertical drilled hole 121 is closed by a welded steel ball 124.

Thus the openings 38b and 39b on the back face of the valve block of FIGS. 11 and 19 are interconnected with the transfer passageways 57 and 58 so that outlet fluid from the uppermost valve block controlled by the lowermost valve is returned through the transfer passageways 57 and 58 so as to enter the openings 38b and 39b of the uppermost valve block adjacent to end block and be expelled from the outlets 41 and 42 of the uppermost valve block.

When the end blocks are replaced by those illustrated schematically in FIGS. 38 and 39 with extended dual inlet passages, the manifold will operate in a two line reversing system of the type employing a reversing pump such as manufactured and sold by Farval Division, Eaton Yale & Towne Inc. under the trade name Farval Dualine lubrication system described in the publication entitled "Farval Centralized Systems of Lubrication," Bulletin No. 26–W. The passageways 18 and 19 would be subjected to pressure and relief in alternating reversal.

In such application, assuming for simplicity that the passageways 18 and 19 are plugged off at the outer face of an end block 12, with the valve pistons located as in FIG. 1, with line 19 pressurized and line 18 relieved, the pistons of valve number 2 would be held to the left, as drawn by the supply pressure, as would those of valves 3 and 4. In valve number 4, however, this pressure would be directed against the left hand end of valve number 1, and its pistons would be moved to the right. When the pressure conditions in lines 18 and 19 were next reversed, valve number 1 would direct such pressure to the left hand end of valve number 2, moving its pistons to the right; valve number 2 would shift number 3, number 3 would shift number 4, while valve number 4 would shift the pistons of valve number 1 to the left, and there would be no further change until the next pressure reversal. It will be apparent that with each subsequent pressure relief reversal on lines 18 and 19, all valves will discharge, with valve number 1 out of phase with those following it, so far as piston movement is concerned.

The result is a dual-line system manifold that is progressive in operation within itself only. It will be apparent that by unplugging the lines 18 and 19 in the end block 12, other manifolds of this type may be connected in series with the first, but these will not necessarily operate in sequence, except within themselves.

Although constructions have been shown in which all of the feeders are of the same body design and employ pistons which are similar in function, differing if desired in length and as to whether a single integral piston or split pistons are employed, the invention is not limited thereto and does not exclude the use of "slave" pistons of the type represented by 2-landed pistons shown in Higgens Patent 2,834,433. These would be used in conjunction with one or more, preferably a plurality of valve bodies of the type illustrated in FIG. 1. For any feeder in the assembly in which a single 2-landed piston of the type illustrated in Higgens Patent 2,834,433 was used, the passageways with inlet ports 48 and 49 might be omitted since the supply of lubricant to the succeeding feeder would take place through a passageway 43 or 44 from a port at passage branch 45 or 46, respectively, corresponding to ports 7f and 7g and passageways 6 and 6a shown in the Higgens patent.

Figure 41:
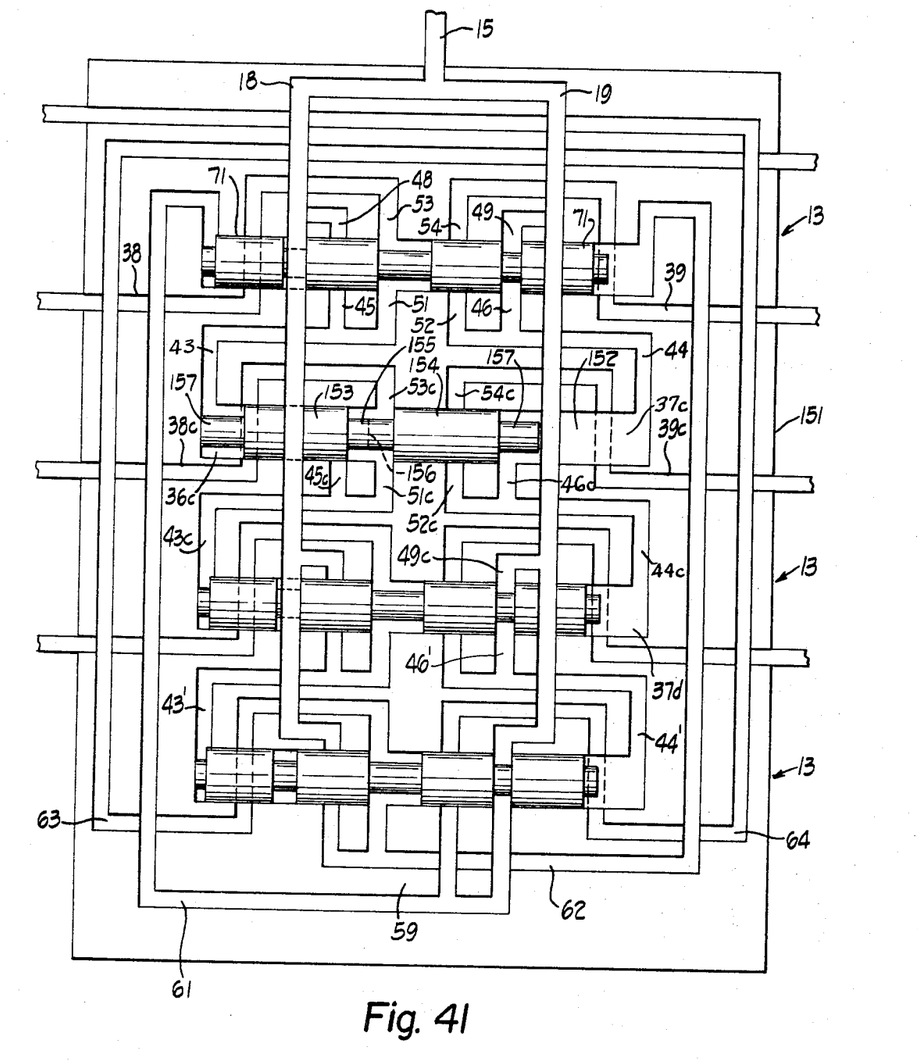
FIG. 41 is a schematic and flow diagram of a modification of the arrangement of FIG. 1 in which one or more blocks with fewer ports are employed to provide feeder action without reversing-valve action in such blocks.

A lubrication manifold has been described and illustrated in which all the valve bodies may be of the same design but nevertheless different amounts of output from different feeders may be obtained by employing pistons of different lengths and consequently of different amounts of axial travel. As shown in FIG. 41, a lubricating system may be employed having one or more feeder units or valve blocks 13 of the type described in connection with FIG. 1 and FIGS. 2 to 37, and one or more valve blocks or feeder units 151 with single 2-landed pistons. The valve blocks 13 may have pairs of 2-landed pistons in their cylinders or a single integral multi-landed piston in each cylinder as previously described.

The valve blocks 151 are similar to the other valve blocks except that their cylinders 152 have no connection with the inlet passageways 18 and 19 and the inlet passageways with inlet ports 48 and 49 are omitted. Nevertheless the blocks 151 have drilled holes corresponding to those of the other blocks for enabling the inlet passageways 18 and 19 to continue on to succeeding blocks. The valve blocks 151 have piston means with the end lands or outermost lands 71 (FIG. 29) omitted.

As shown in FIG. 41, the piston means in the cylinder 152 of the valve block 151 may comprise a piston with two lands 153 and 154 connected by a stem 155. However the invention is not limited to the use of an integral 2-landed piston and, if desired, the piston means may be split along a division line 156 so as to provide two inwardly extending stems on separate pistons 153 and 154. In the same manner as previously described, high back pressure sufficient to part the pistons will then close the port to the next valve block and enable the inlet pressure to build up enough to overcome the back pressure. For the length of travel of the piston means illustrated there are also end stems 157.

The lands of the piston means in the feeder unit 151 are so spaced that branches 51c and 46c of transfer passageways 43c and 44c are opened simultaneously while branches 45c and 52c are closed. At the same time outlet port 53c of outlet passageway 38c is open and outlet port 54c of outlet passageway 39c is closed. When the piston means are in the opposite direction in the cylinder 152, the ports and branches described as closed are open and vice versa.

The system of FIG. 41 operates in the following manner. Assuming that initially all of the pistons are to the right except the piston means in the uppermost cylinder, inlet pressure through the inlet passageway 19 is admitted through the open inlet port 49 and the branch 46 of the transfer passageway 44 to the right hand end of the cylinder 152 in the unit 151. This causes the piston means in the cylinder 152 to move to the left thereby expelling lubricant from the left hand end of the cylinder 152 through the transfer passageway 43, the branch 51, the outlet port 53 and the outlet passageway 38.

Thus far the operation is the same as takes place in the system of FIG. 1. However, in this case since the cylinder 152 has no inlet ports and no connections to the inlet passageways 18 and 19, the control of the next valve block takes place in a different manner. Since the piston means in the cylinder 152 has no end lands, as soon as the land 154 has been moved to the left to the position shown in FIG. 42 a connection is made between the right hand end chamber 37c of the cylinder 152 and the branch 46c of the transfer passageway 44c leading to the next cylinder. Consequently inlet fluid pressure from the passageway 19 which has been applied through the transfer passageway 44 to the piston means in the cylinder 152 continues on through the branch 46c and the passageway 44c to the right hand end chamber 37d of the next cylinder causing the piston means therein to travel to the left of the position shown in FIG. 41. This causes the lubricant to be expelled from the left hand end chamber of the succeeding cylinder through the passageway 43c, branch 51c, outlet port 53c and outlet passageway 38c in the same manner as previously described.

As soon as the piston means in the unit 13 below the unit 151 has moved to the left to the position shown in FIG. 41, a connection is made from the inlet line to the next succeeding cylinder. The manner in which the connection is made depends upon the type of valve block whether it is of the multilanded type of block 13 or the 2-landed type. If it is of the multilanded type as shown, the connection is made through an inlet port 49' and transfer passageway 44' as shown. On the other hand, if the valve block is question were of the 2-landed type instead of the multilanded type, the connection would be made in the manner described in connection with unit 151.

Regardless of which type of valve is employed, the crossover 59 of passageways 61 and 62 takes place in the same manner as described in connection with FIG. 1.

Certain embodiments of the invention and certain methods of operation embraced therein have been shown and particularly described for the purpose of explaining the principle of operation of the invention and showing its application, but it will be obvious to those skilled in the art that many modifications and variations are possible, and it is intended therefore, to cover all such modifications and variations as wall within the scope of the invention.

What is claimed is:

1. In a lubricating system manifold a valve comprising a body formed with a hollow cylinder therein and a pair of pistons endwise, slidably mounted in the hollow cylinder to divide the hollow cylinder into end chambers and a central chamber, each piston having a pair of lands separated by a neck to form intermediate port areas in the cylinder, the body being formed with a pair of outlet passages each having a port in the central chamber of the cylinder, a pair of inlet passages each having a port in the intermediate port area of the cylinder between one of the outlet ports and an end chamber of the cylinder and a pair of transfer passages each connected at one end to an end chamber and leading at the opposite end to an intermediate port area and the central chamber and located to cooperate with an inlet port and an outlet port, the piston at each end of the cylinder serving to close one or the other of the ports according to the position thereof in the cylinder.

2. A divisional lubricant feeder comprising in combination two spaced apart end blocks and a plurality of valve blocks between said end blocks, said blocks being connected together, each valve block having a cylinder therein and piston means in the cylinder endwise slidable and provided with 4-lands including a pair of central lands spaced to form a central chamber in the cylinder and end lands, forming end chambers in the cylinder and each spaced from one of the central lands to form an intermediate port area in the cylinder between the central chamber and one of the end chambers, the block means being formed with opposite faces adapted to abut corresponding faces of other block means and other faces referred to as exterior faces, and being formed with a pair of outlet passages each having an exhaust port in the central area of the cylinder and an outlet in an exterior face of the block means, a pair of inlet passages each extending between two opposite abutment faces and having a branch with an inlet port in the cylinder and a pair of transfer passages each extending between an end chamber of the cylinder and an area of an abutment face of the block means in alignment with said exhaust and inlet ports, the opposite abutment face having openings also in alignment with said exhaust and inlet ports whereby the transfer passages are adapted to interconnect end chambers of one block means with exhaust and inlet ports of an adjacent block means.

3. The invention of claim 2 wherein the piston means has a neck between the two central lands to space the central lands and form a central annular chamber.

4. The invention of claim 2 wherein the piston means comprises two 2-landed pistons and the central lands are formed with inwardly projecting stems to separate the central lands and form the central annular chamber.

5. The invention of claim 2 with the abutting face ot one block containing transfer passage outlets in abutment with the valve face of an adjacent block containing port cooperating openings, an inlet block with an inlet opening and a pair of branch passages in registry with the inlet passages of the valve block means, and an end block with transfer passages interconnecting a transfer passage of an end-most valve block means with a registering block face port opening in the other end-most valve block means.

6. A divisional lubricant feeder comprising in combination two spaced apart end blocks and a plurality of valve blocks between said end blocks, said blocks being connected together, each valve block having a cylinder and a pair of endwise movable pistons therein, provided with lands having lubricant-tight engagement with the walls of the cylinder said land defining a pair of end chambers, a central chamber, and a pair of intermediate port areas in the cylinder, the feeder having an inlet opening with a pair of inlet passages each opening into one of the intermediate port areas, each block having outlets from the end chambers, and means for actuating said pistons in succession for sequential and cyclical discharge of lubricant from the end chambers of the several blocks through their respective outlets, said means comprising for each block, a first passage connecting one end chamber of that block with one of the inlet passages through one of the intermediate port areas of another block to admit lubricant under pressure into said end chamber and thereby move the pistons endwise in the cylinder and a second passage connecting the other end chamber of that block with an outlet from that block through the central chamber of said another block, when the pistons have been so moved, to conduct lubricant from said another end chamber to said outlet, said first and second passages of one block crossing one another to connect the end chamber of said one block on one side of the central chamber to an intermediate port area of the other block on the opposite side of the central chamber, and the other end chamber of said one block to the central chamber of said another block, and the corresponding passages of another block connecting the intermediate port area of the block toward the same end and with the central chamber thereof.

7. A divisional lubricant feeder comprising in combination two spaced apart end blocks and a plurality of valve blocks between said end blocks, said end blocks being connected together, each valve block having a cylinder and piston means therein, movable endwise between two extreme positions and provided with lands having lubricant-tight engagement with a wall of the cylinder and forming a pair of end chambers, a central chamber and a pair of intermediate port areas in the cylinder, the feeder having an inlet opening with a pair of inlet passages each opening into one of the intermediate port areas, each block having outlets from the end chambers, and means actuating said pistons in succession for sequential and cyclical discharge of lubricant from the end chambers of the several blocks through their respective outlets, said means comprising for each block first and second passages each connecting one end chamber of the block with an intermediate port area and with a port in the central chamber of another block and third and fourth passages each connecting the other end chamber of the block with an intermediate port area and with a port in the central chamber of said another block, each piston means simultaneously opening an intermediate port area on one side of the central chamber and a port to the central chamber on the other side thereof in one extreme position while closing the other port area and the other port to the central chamber when the piston means is in its extreme position in one direction or the other.

8. A divisional lubricant feeder comprising in combination block means containing a plurality of cylinders and endwise movable piston means in each of said cylinders provided with lands having lubricant-tight engagement with the walls of the cylinders and for each cylinder forming a pair of end chambers, a central chamber and a pair of intermediate port areas in the cylinder, the feeder having an inlet opening with a pair of inlet passages each opening into one of the intermediate port areas of each cylinder the block means having outlets from the end chambers of each cylinder and means for actuating said piston means in succession for sequential and cyclical discharge of lubricant from the end chambers of the several cylinders through their respective outlets, said means comprising for each cylinder a pair of exhaust ports at the central chamber, a first passage communicating an end chamber of one cylinder to an exhaust port and an adjacent intermediate port area of another cylinder, a second passage communicating the opposite end chamber of said one cylinder to the second exhaust port and the second intermediate port area of said another cylinder, a third passage connecting an exhaust port to a cylinder outlet and a fourth passage connecting the other exhaust port to the other outlet of the cylinder, the piston means being adapted to close one exhaust port while it opens the other according to the position of the piston means in the cylinder.

References Cited
UNITED STATES PATENTS
2,973,058    2/1961    Bricout _______________ 184—7

FOREIGN PATENTS
702,682    1/1931    France.
1,245,824    10/1960    France.
628,481    8/1949    Great Britain.
757,544    9/1956    Great Britain.

LAVERNE D. GEIGER, *Primary Examiner.*

E. J. EARLS, *Assistant Examiner.*